Figure 1:

T. H. MÜLLER.
Lead-Pencils.

No. 126,980.        Patented May 21, 1872.

Witnesses

Inventor.

UNITED STATES PATENT OFFICE.

TEILE H. MÜLLER, OF YONKERS, NEW YORK.

IMPROVEMENT IN LEAD-PENCILS.

Specification forming part of Letters Patent No. 126,980, dated May 21, 1872.

*To whom it may concern:*

Be it known that I, TEILE H. MÜLLER, of Yonkers, county of Westchester, and State of New York, have invented certain new and useful Improvements in Lead-Pencils and India-Rubber Erasers combined, of which the following is a specification:

My invention relates to that class of lead-pencils in which one end of the wooden sheath contains a piece of rubber erasive material, and of which the pencil patented to Hymen L. Lipman on the 30th March, 1858, is the type.

The Lipman pencil, as described in said patent, possesses great merit and advantages; for the pencil is of the same size throughout. It completely incloses all of the eraser excepting such portion as is actually in use. The wooden sheath can be cut away as the rubber wears down, and the pencil can be made with very little increased expense. There was, however, one obstacle to its complete success, and that was that the wooden sheath was liable to, and did frequently, split or break when the rubber was used. This difficulty it has since been attempted to remedy in various ways—as, for instance, by making the sheath at the rubber-end thicker and larger, as described in Joseph Reckendorfer's patent of November 4, 1862; or by making the rubber case of more resisting material, such as hard wood or paper, fitted on the end of the pencil.

It has been my object to produce a lead-pencil in which the wooden sheath, while homogeneous throughout, and without enlargement at its rubber-end, shall both contain a rubber body of sufficient size for erasing purposes and possess the requisite strength in that part which surrounds the rubber to prevent it from splitting or breaking. In other words, I have it in view to produce a Lipman pencil which shall not possess the defect which has hitherto characterized that pencil.

I have found that the sole obstacle in the way of the success of the Lipman pencil as originally patented lies in the fact that the rubber body used by Lipman was a rectangular prism, and that, consequently, a correspondingly-rectangular socket was required for it in the pencil-sheath. In order to obtain a prism of sufficient sectional area the rubber body was necessarily made so large that the angles of the correspondingly-sized socket in the sheath approached very near to the surface or exterior of the pencil; and the sheath at these points was very weak, while at other points it was quite strong enough for all purposes. It is at just these weak points that the sheath in the original Lipman pencil is apt to split and give way; and so long as the rubber body has a prismatic form this objectionable feature will remain.

To obviate this defect I make the rubber body or stick cylindrical in form, or substantially so, and make the socket in the sheath of corresponding shape, so that the wooden wall which surrounds the rubber will be of equal strength at every point. In this way not only do I gain strength, but I am enabled to put into the pencil-end a rubber body of larger sectional area than would be practicable were the rubber rectangular in section, this being manifest without further explanation. I thus produce a wooden pencil without an enlarged end, which contains a rubber eraser of sufficient size for all practical purposes, surrounded by a wooden wall or case of ample strength, and making part and parcel of the sheath, as in the Lipman pencil referred to above.

The manufacture of the pencil is conducted, in all other respects save the one noted, like that of the Lipman pencil.

Figure 2:

In the drawing accompanying this specification, Figure 1 is a perspective view, and Fig. 2 is a longitudinal central section of my improved Lipman pencil.

A is the pencil-sheath, b the lead, and c the rubber eraser.

What I claim as my invention, and desire to secure by Letters Patent, is—

The herein-described improved lead-pencil and rubber eraser combined, consisting of a wooden lead-pencil, inclosing at one end a rubber eraser of cylindrical form, or substantially so, substantially as shown and set forth.

In testimony whereof I have signed my name to this specification before two subscribing witnesses.

TEILE H. MÜLLER.

Witnesses:
LEOPOLD AUSBACHER,
JOSEPH JOFESER.